GEORGE W. LEONARD.

Improvement in Side-Hill Plows.

No. 116,070. Patented June 20, 1871.

c - spring catch  Fig. 3.

Witnesses:
A. W. Almqvist
Wm. H. C. Smith.

Inventor:
G. W. Leonard.

Per  _____
Attorneys.

116,070

UNITED STATES PATENT OFFICE.

GEORGE W. LEONARD, OF MIDDLE VALLEY, PENNSYLVANIA.

IMPROVEMENT IN SIDE-HILL PLOWS.

Specification forming part of Letters Patent No. 116,070, dated June 20, 1871.

*To all whom it may concern:*

Be it known that I, GEORGE W. LEONARD, of Middle Valley, in the county of Wayne and State of Pennsylvania, have invented a new and useful Improvement in Swivel or Side-Hill Plow; and I do hereby declare that the following is a full, clear, and exact description thereof, which will enable others skilled in the art to make and use the same, reference being had to the accompanying drawing forming part of this specification, in which—

Figure 1:
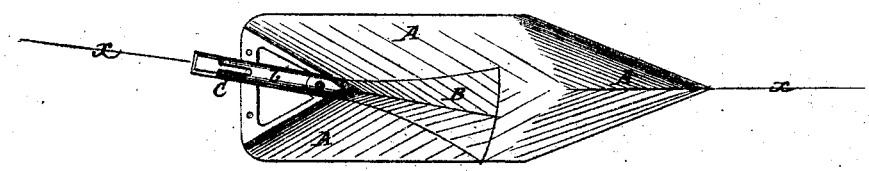
Figure 2:
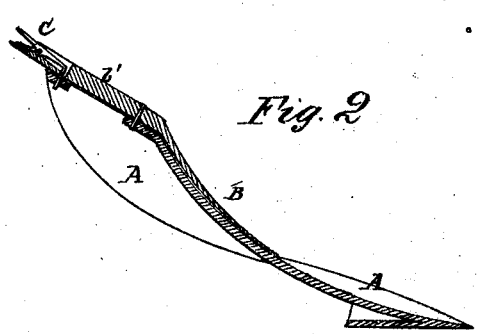
Figure 2:

Figure 1 is a plan view of my improved plow. Fig. 2 is a detail sectional view of the same taken through the line $x\,x$, Fig. 1. Fig. 3 is a side view of the plow in working position.

Similar letters of reference indicate corresponding parts.

My invention has for its object to improve the construction of swivel or side-hill plows, so as to raise the top of the working mold-board to prevent it from clogging, and to enable it to turn a better furrow; and it consists in the combination, with the double mold-board, of an adjustable plate, as hereinafter more fully described.

A represents the double mold-board, each edge of the forward part of which serves alternately as a share and as a cutter, as the double mold-board may be turned to turn the furrow to the right-hand and to the left-hand side of the plow. The division line between the two mold-boards of a swivel or side-hill plow must necessarily be low, so that it does not properly turn the furrow-slice, and is liable to choke and clog. To remedy this I pivot a plate, B, to the upper part of the double mold-board A. The lower part of the plate B is so formed that when turned to either side it may form a continuation upward of the mold-board of the other side, causing the plow to work much more effectively, turning a better furrow. The upper end of the plate B terminates in a bar, $b'$, or has a bar, $b'$ attached to it, with which is connected a spring-catch, C, which, when the plate B is adjusted in proper position upon either side, drops into a hole formed in the frame or brace of the said double mold-board, and locks the said plate B in position.

Having thus described my invention, I claim as new and desire to secure by Letters Patent—

The combination of the pivoted adjustable plate B with the double mold-board of a swivel or side-hill plow, substantially as herein shown and described, and for the purpose set forth.

GEORGE W. LEONARD.

Witnesses:
DARIUS G. PURDY,
WM. HANKIN.